July 27, 1926.
R. E. POIRIER
1,593,986
DEVICE FOR ANCHORING SCREWS AND NAILS IN WALL CAVITIES
Filed Nov. 9, 1921
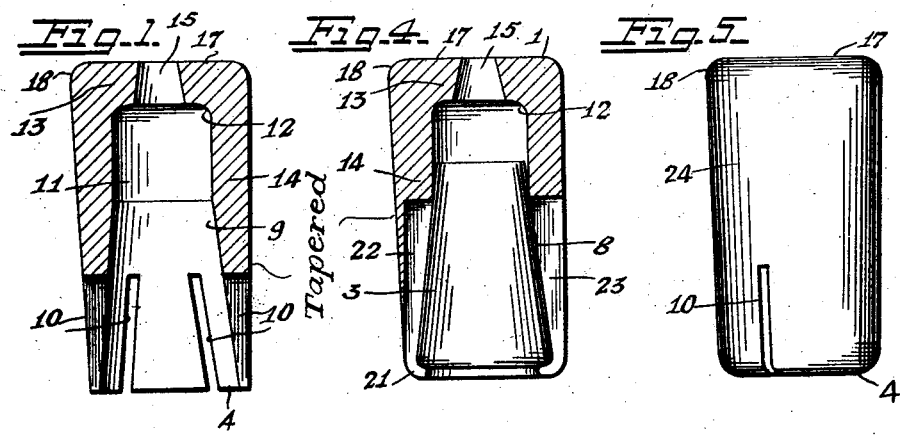
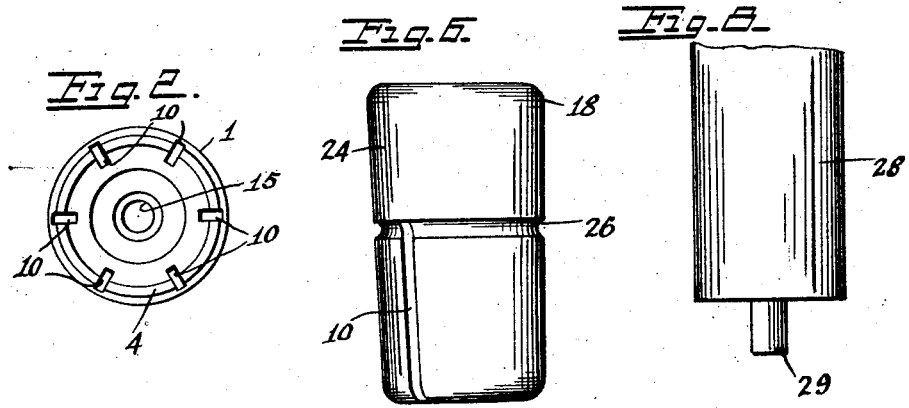
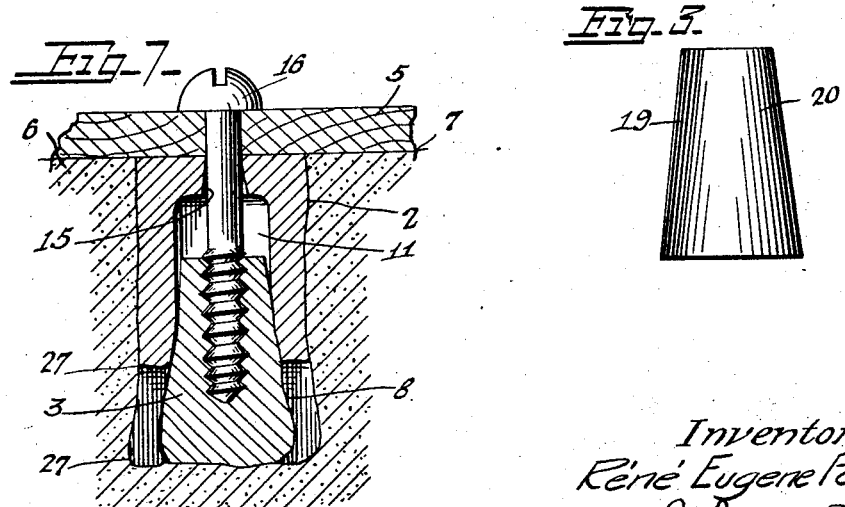
Inventor:
René Eugene Poirier
by Attorney Patented July 27, 1926.

1,593,986

UNITED STATES PATENT OFFICE.

RENÉ-EUGÈNE POIRIER, OF PARIS, FRANCE.

DEVICE FOR ANCHORING SCREWS AND NAILS IN WALL CAVITIES.

Application filed November 9, 1921, Serial No. 514,089, and in France June 16, 1921.

Hitherto the means employed for fixing any object or article of light weight to a wall, a ceiling, or to the ground, have been very varied, and numerous systems exist which have given results which are little in accordance with the advantages claimed for them.

The devices heretofore employed have been either unnecessarily complicated, or inefficient and apt to exert destructive effects on the wall in which they are inserted. The difficulties encountered have been particularly acute in the case of plugs for use on light and relatively thin partition walls of plaster and similar composition in modern building. In many cases where rigidity is necessary it has been customary to set the plug in a body of molten lead or sulphur poured into the containing cavity and allowed to harden around it, but this has involved costly and complicated operations. When it was desired to provide a base into which ordinary nails or wood screws could be inserted, simple wooden plugs have been driven and wedged into cavities in the wall of masonry, but these have been unsightly, insecure and often destructive in their action on the wall.

The present invention overcomes these difficulties and supplies a simple standardized form of composite plug which, with certain necessary changes in dimensions and materials of manufacture, forms a neat appearing and satisfactory base by which nails, screws, hooks, bolts, etc., can be firmly fastened to any form of masonry whether it is the thin plaster partition walls of a low-priced house or apartment, or solid stone work.

Primarily the invention comprises the combination of a wedge-shaped member of a character to receive and securely hold the nail or screw to be employed (such as wood, in the case of ordinary nails or wood screws) and a sleeve of special character capable of being easily inserted in the wall cavity, containing the wedge member and being sufficiently expanded by said wedge, upon the application of a comparatively small amount of inward driving force to the composite plug formed by assembling the two above described elements of the combination, to completely and tightly fill said wall recess or cavity and key the wedge member firmly therein.

While the invention is employed in various special forms to meet special conditions and requirements of use, the best form of apparatus at present known to me, embodying a commonly used form of the invention, is illustrated in the accompanying sheet of drawings in which.

Fig. 1 is an axial cross-section of the sleeve before use.

Fig. 2 is a bottom view of the same.

Fig. 3 is a side view of one form of wedge member illustrating different angles of inclination of the wedge surfaces.

Fig. 4 is an axial cross-section of the sleeve and an inserted wedge assembled in position theoretically assumed during use, and illustrating different forms of slot in said sleeve.

Fig. 5 is side elevation of the sleeve.

Fig. 6 is a similar view of a slightly modified form of sleeve.

Fig. 7 is an axial section of a plug in use, parts being broken away, showing actual deformation resulting from the force exerted in driving it into final position in the wall recess; and, Fig. 8 is a detail view of a tool for effecting such driving operation, parts being broken away.

Throughout the drawings like reference characters indicate like parts. 1 represents generally the sleeve or sheath which is made of some slightly plastic material, such as lead, or an alloy or composition which will undergo the desired deformation on application of reasonable pressure for forcing it into the wall cavity 2 (see Fig. 7). Preferably the exterior 24 of this sleeve has a slight but uniform taper from its thick-walled end 17, to its thin-walled end 4, as shown in Figs. 1, 2, 4, 5 and 6. The limits of such taper used in practice have been so far between 50 minutes and 2 degrees, to the axis of the sleeve. The interior bore 11 of this sleeve flares out as shown at 9 toward the smaller and thin-walled end of the sleeve to form a narrow edge or rim 4 at said end. The angle of flare is preferably such that the interior surface thereof is inclined at an angle of from 5 to 7 degrees to the exterior surface of the sleeve, and preferably this end of the sleeve has its wall slit at one or more places 10, along planes coinciding with the axis of the sleeve. These slits may go all the way through the wall as shown at 23, Fig. 4, or nearly through as shown at 22. The upper portion 11 of the bore of the sleeve may be cylindrical until it reaches the end wall 13 which closes that end of the sleeve, except for the central perforation 15 in said wall 13. The bore 11 should preferably merge into the inner surface of the wall 13 by curve 12, and the outer surface 17 of said end wall should similarly merge into the outer surface 24 of side walls 14 by curve 18.

If desired the expansibility of the thin-walled end of the sleeve 1 may possibly be increased by forming a circumferential groove 26 in its exterior as shown in Fig. 6.

The second element of my composite wall plug is the wedge or base 3 preferably made in the form of a truncated cone as shown in Figs. 4 and 7, the base of which is of a diameter sufficient to nearly, but not quite, fill the bottom of the cavity 2 formed in wall 6. This wedge is shown in the drawings as made of cork or wood to receive and hold the ordinary wood screw 16, there illustrated as holding the plate 5 against the surface 7 of wall 6. The coned surface preferably has an inclination to the axis of the cone of from 7 to 10 degrees according to the hardness of the material of which it is composed. In Fig. 3 the left hand half 19 is intended to illustrate an inclination of 7 degrees, and the right hand half 20, an inclination of 8 degrees in such wedge surface.

In Fig. 8 I have shown a convenient tool for driving the composite plug into the wall cavity. 28 is the body of the tool having a diameter approximately equal to the external diameter of sleeve 1, and 29 is a central projection thereon having a diameter equal to or slightly less than the smallest diameter of perforation 15 in the end wall 13 of said sleeve.

In carrying my invention into operation the cavity 2 of substantially uniform cross-section throughout is first cut or bored in wall 6. The wedge 3 is then inserted in said cavity and the sleeve 1 forced in over it by the tool 28, 29, or the sleeve and wedge may first be assembled and inserted in the cavity as a unit. The screw 16, or other member to be attached to and supported by the wall, is then inserted through perforation 15 and forced into wedge 3 by revolving or hammering it in the usual way. Because of the difference between the inclinations of the outer surface 8 of wedge 3, and the flaring inner surface of sleeve 1 (amounting usually to about 2 degrees) the initial area of contact between the two is limited to the thin rim 4 of the sleeve end which engages the wedge at a point somewhat above its base. The diameter of wall cavity 2 is made equal to the exterior diameter of the larger and outer end of sleeve 1, so that while the said outer end will fit snugly into said cavity when driven home, as shown in Fig. 7, the inner smaller end of the tapered sleeve will not initially touch said cavity walls. When, however, said sleeve is driven home over said wedge 3, its thin-walled inner end is expanded by the wedge until it snugly fits said cavity throughout. The slits 10 in said sleeve greatly facilitate this action and reduce the amount of driving pressure required to secure the above stated result. Under suitable driving pressure the slightly plastic material of the sleeve may even bend around the inner, larger end of the wedge as shown at 21 in Fig. 4, or may be thus modified and also additionally deformed as shown at 27 in Fig. 7 so as to adapt itself completely to any inequalities in the surface of the cavity walls, or even to outwardly compress the weaker surface portions of said cavity walls. In any event the ultimate area of contact between wedge and sleeve is increased by the expansion and deformation of the latter until said area includes nearly the whole of the inclined surface 8 of the wedge 3.

As a result the composite plug formed by sleeve and wedge is firmly anchored in the wall cavity and when screw 16 or other similar member is driven through perforation 15 into wedge 3 it is firmly supported thereby against any lateral, external bending strains applied thereto, and when any force is applied tending to pull said screw out of the cavity the only result is to jam the wedge member 3 more firmly into sleeve 1, which latter is thereby further expanded and even more firmly anchored in cavity 2, so that some of the parts must rupture before any perceptible displacement can occur.

Preferably the length of slots 10 is made enough less than the length of wedge 3 to insure the ultimate area of contact between wedge and sleeve extending beyond them, as shown in Figs. 4 and 7, so as to produce a water-tight seal between sleeve and wedge which will prevent moisture in the cavity from leaking out to the wall surface and also prevent external moisture from reaching the bottom of the wall cavity.

If desired the sleeve 1 may be forced over wedge 3 and the thin rim 4 of the inner end of said sleeve may be initially bent around the larger end of the wedge as shown at 23, when the parts are assembled before insertion in the wall cavity. In any case the sleeve 1 should preferably be of a length slightly greater than the depth of wall cavity 2 so that before the outer end of the plug is forced into the plane of wall surface 7, the thinner portions of the sleeve walls will be upset and thickened, as shown in Fig. 7, sufficiently to almost completely fill the annular space between wedge and cavity wall.

The perforation 15 in the closed end of sleeve 1 preferably has inwardly flaring walls, as shown, and the smallest diameter of this perforation should be slightly less than the greatest diameter of screw 16, or other member to be held by the plug. With the parts so proportioned, the thread of the screw will engage the edge of the perforation 15 when the screw is inserted therein and this will help to force the screw into the wedge 3 when it is revolved, holds it upright while being screwed into the wedge, supports its outer end after it is in final position, and affords tight closure for the chamber formed by the portion of the sleeve bore not filled by wedge 3. If the perforation 15 had a cylindrical shape it could not so safely be made of less diameter than the screw or nail to be used, as the force then necessary to drive in a nail might collapse the sleeve wall 13.

Making the sleeve 1 of slightly tapering exterior renders it easily inserted in the wall cavity 2 while retaining a tight fit at the cavity mouth. The curve 18 permits the outer end of the sleeve 1 of slightly plastic material to be somewhat battered or deformed by the pressure of the driving tool without spreading out against the adjacent edge of wall surface 7 and thereby cracking or blistering the same.

Plastic compositions of granulated cork, gums, resins, etc., can be used in place of lead or soft metal for sleeve 1, and materials other than wood or cork can be used for making the wedge member 3 when bolts, machine screws or other members of special character are to be substituted for the wood screw 16 shown in the particular example of my invention herein illustrated. Evidently also other geometrical forms of sleeve and wedge may be substituted for the cylinder and truncated cone here shown and described as the best forms for general use.

Having described my invention, I claim:

1. In a wall plug adapted to be expanded to fill a recess of substantially cylindrical form in a wall, a sleeve of slightly plastic material having an exterior shape slightly tapering from a diameter at its outer end approximately equal to that of said recess to a diameter at its inner end slightly less than that of said recess, combined with wedging means located interiorly of said sleeve adapted to expand the same to fill the entire recess when said sleeve is driven into it and over said wedging means.

2. A structure such as set out in claim 1, in which the angle of taper of said sleeve exterior to the axis thereof does not exceed two degrees.

3. In a wall plug adapted to be expanded to fill a recess in a wall, a sleeve of slightly plastic material substantially filling said recess and having a flaring bore such that its inner end is reduced to a thin rim, combined with a wedge located in said flaring bore, with its axis coinciding with the axis of said bore, the angle of flare of said bore being slightly less than the angle of inclination of the surfaces of the wedge to its axis, whereby the area of initial contact between said wedge and sleeve is limited to the thin inner end of the latter but, when said sleeve is driven entirely over said wedge, it is deformed to establish contact therewith over substantially the entire opposing surfaces of said members.

4. A structure such as set out in claim 3 in which the difference between said angles is between two and five degrees.

5. A structure such as set out in claim 3 in which the wall of the thin end of said sleeve is slit along planes coinciding with its axis.

6. A structure such as set out in claim 3, in which the wall of the thin end of said sleeve is slit along planes coinciding with its axis but through a distance substantially less than the length of the wedge, whereby a water-tight joint is formed between said wedge and the unslitted portion of said sleeve when the latter is forced down upon the former.

7. A combination such as defined in claim 1 which is designed for use in walls made of relatively friable material, in which combination said sleeve is made of soft metal and has the outer edges of its exposed end slightly rounded, whereby, after said plug has been sunk in said recess, the exposed end of the plug may be somewhat deformed under the impact of a driving tool without expanding radially far enough to fracture the surrounding edges of the said wall recess.

8. In a wall plug, the combination of a sleeve of slightly plastic material closed at its outer end except for a central perforation in said end, of a diameter considerably less than the internal diameter of said sleeve, and a wedge adapted to receive and hold a screw or nail and over which wedge the open end of said sleeve is adapted to be forced and expanded, whereby the wall of said perforation in the outer end of said sleeve is adapted to serve as a guide and support for said nail or screw.

9. A combination such as set out in claim 8 in which said perforation has a flaring wall.

10. A combination such as set out in claim 8 in which said perforation has an inwardly flaring wall.

11. A structure such as set out in claim 8 combined with a screw having a diameter slightly greater than the smallest diameter of said perforation.

12. In a wall plug adapted to receive and hold ordinary nails and wood screws, the combination of a wedge of yielding material in which said nail or screw may be embedded and a sleeve having a flaringly bored inner end terminating in a thin rim of slightly plastic material adapted to be forced over, and expanded by, said wedge to tightly fill any recess into which said plug loosely fits before such expansion.

13. A combination such as set out in claim 12 in which said sleeve has its outer end closed except for a central perforation adapted to serve as a guide and support for the nail or screw.

In testimony whereof, I affix my signature.

RENÉ-EUGÈNE POIRIER.